106-89

CROSS REFERENCE

EXAMINER

Patented June 12, 1951

2,556,156

UNITED STATES PATENT OFFICE 2,556,156

CEMENTITIOUS MATERIAL AND METHOD OF MAKING

Steven B. Avery, East Orange, N. J., assignor, by mesne assignments, to Coprox, Inc., New York, N. Y., a corporation of Delaware No Drawing. Application November 26, 1948, Serial No. 62,240

2 Claims. (Cl. 106—89)

My invention relates to an improvement in cementitious materials, such as cement, mortar concrete, etc., and has for its primary object to provide a cementitious material which is highly water repellant.

A more specific object of my invention is to provide a cementitious material, as above indicated, which not only is highly water repellant but also of increased strength and whose hardening time is materially reduced as compared with similar materials commercially available prior to my invention.

A more specific object of my invention is to provide a hydraulic cement, namely, a cement which hardens under water as distinguished from water soluble cements, or a cementitious material containing a substantial amount of hydraulic cement, and which cement or cementitious material, as the case may be, is highly water repellant. Portland cement is one example of a hydraulic cement to which my invention is particularly applicable.

Hydraulic cement of the Portland type is obtained conventionally by burning a mixture of calcareous and argillaceous materials and pulverizing the resultant clinker. When the pulverized clinker is mixed with water it solidifies into a porous artificial rock.

This type of cement and products made therefrom, such as concrete burial vaults, concrete pipe, cement mortar, cement stucco, surface coatings and paints, and other products too numerous to mention, but all of which contain substantial amounts of Portland cement, normally absorb from 6% to 10% of water from a bone dry condition while products such as those made from Portland cement and asbestos fibre, normally absorb from 16% to 22% water. Upon freezing, this water expands between 9% and 10% with a pressure of approximately 10,000 pounds per square inch, eventually causing partial or total disintegration of the product. The absorption of water causes a moisture expansion said to be one inch in one hundred linear feet. This expansion, coupled with normal thermal expansion, often causes cracking and eventual disintegration of the product.

Many different materials have been used in an attempt permanently to water proof hydraulic cement such as Portland cement, for example, and products containing a substantial amount of hydraulic cement, but so far as is known these materials weaken the cement or they themselves have a comparatively short life.

My invention provides a hydraulic cement and products containing a substantial amount of this cement, the pores and voids of which are permanently and completely filled with a water repellant material which is as permanent as Portland cement, which in itself is water insoluble; this highly water repellant material at the same time imparts increased strength to the final product and materially shortens the time required for its hardening.

In the production of my improved product I incorporate in a hydraulic cement mix, such as a Portland cement mix, for example, from 0.5% to 7% by weight of the cement, at least one member of the group consisting of cuprous oxide and finely divided metallic copper and from 2% to 7% by weight of the total mix of calcium chloride.

Apparently at first the calcium chloride is taken by by the cement, causing it to hydrate more rapidly than normally and form a partial jell. This action produces a stronger bond than is normally the case and results in materially increased strength of the resulting product. In addition to this action, the molecules of calcium and chlorine in the form of calcium chloride coming in contact with moisture form hydrochloric acid which readily attacks copper and forms copper chloride, which expands by accretion and fills the voids and pores in the cement mass.

The reaction between the chloride and the copper or the cuprous oxide is slow and continuous over many months so that the reaction is not completed during the time required for the cement to harden sufficiently to withstand the pressure created by the formation of the copper chloride or copper oxychloride, enabling these materials to fill all pores and voids of the mass without cracking or checking of the same.

I have found that my improved product possesses advantages other than its water repellant characteristic inasmuch as the same will not support fungus growth, including athletes' foot germs, is avoided by ants, roaches, silver fish and other insects, and the material is so electrically conductive that it cannot be made to spark.

As above pointed out, I may use from 0.5% to 7% by weight of the hydraulic cement of finely divided cuprous oxide or copper powder. I have found that the optimum amount is approximately 2.5% of the hydraulic cement by weight.

I have mentioned 2% to 7% calcium chloride by weight of the dry mix. The optimum amount I have found is 4% by weight of the total dry mix.

In addition to all of the foregoing, I find it of advantage for some purposes, such as in cementitious surface coatings, for example, to incorporate a water insoluble metallic soap in the mix. Examples of such soaps which are compatible with the calcium chloride, are aluminum stearate, calcium stearate, zinc stearate. This metallic soap has or may have several functions. For example, in preparing a mix, the stearate promotes the proper distribution of the ingredients of the mix, which is of considerable advantage when preparing surface coatings, especially; the stearate apparently operates to retard the undesirable rapid evaporation of the moisture and being inherently water insoluble, functions as a temporary water repellant, while the copper and chloride are reacting to provide a permanent water repellant.

Another inherent advantage in the use of the metallic soap is the protection afforded a dry mixture of the copper and chloride against moisture absorption, in that the finely divided metallic soap forms a moisture repellant film over the copper and chloride particles, enabling these materials to be shipped long distances or stored indefinitely without deterioration.

The amount of stearate is small and may vary from 0.1% to 3% by weight of the cement, the optimum amount being 1%.

What I claim is:

1. A cementitious product produced by hydrating a mixture comprising cement of the Portland type, cuprous oxide in amount from 0.5% to 7% by weight of the cement, and calcium chloride in amount from 2% to 7% by weight of the cement and cuprous oxide mixture, to effect reaction of the cuprous oxide with the calcium chloride, the reaction product thus produced substantially filling the pores and voids of the cement.

2. The method which comprises adding cuprous oxide and calcium chloride to cement of the Portland type in substantially the following proportions: cuprous oxide 0.5% to 7% by weight of the cement, calcium chloride 2% to 7% by weight of the cement and cuprous oxide, and then hydrating the mixture to effect reaction of the cuprous oxide with the calcium chloride and to set the mixture, the reaction product produced substantially filling the pores and voids of the cement.

STEVEN B. AVERY.

REFERENCES CITED

The following references are of record in the file of this patent:

UNITED STATES PATENTS

| Number | Name | Date |
|---|---|---|
| 866,376 | Meade | Sept. 17, 1907 |
| 1,296,468 | Blumenburg | Mar. 4, 1919 |
| 1,318,313 | Coleman | Oct. 7, 1919 |
| 1,982,541 | Scripture | Nov. 27, 1939 |
| 2,221,175 | Bechtold | Nov. 12, 1940 |
| 2,465,278 | Schenker | Mar. 22, 1949 |
| 2,469,356 | Hammond | May 10, 1949 |

FOREIGN PATENTS

| Number | Country | Date |
|---|---|---|
| 682,857 | Germany | 1939 |